Patented July 11, 1933

1,917,441

UNITED STATES PATENT OFFICE

ERICH FISCHER, OF BAD SODEN-ON-THE-TAUNUS, AND ALBERT KISSLING AND HERBERT KRACKER, OF FRANKFORT-ON-THE-MAIN, GERMANY, ASSIGNORS TO GENERAL ANILINE WORKS, INC., OF NEW YORK, N. Y., A CORPORATION OF DELAWARE

NEW ORTHO-ANILINE-SULFONIC ACID

No Drawing. Application filed October 14, 1930, Serial No. 488,698, and in Germany October 24, 1929.

The present invention relates to new ortho-aniline-sulfonic acids.

We have found that new ortho-aniline-sulfonic acids are obtainable by treating a primary aromatic amine of the following general formula

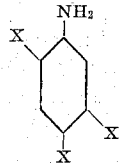

wherein X stands for alkyl, O-alkyl, O-aryl, O-aralkyl, CO-aryl, $SO_2$-aryl, $NO_2$, $SO_3H$, COOH or halogen, with a molecular proportion of a halogen sulfonic acid, advantageously in the presence of a diluent, moisture being excluded.

The sulfonation occurs with very good yields.

We prefer to use as diluents for instance, aliphatic hydrocarbons of high boiling point, their halogen substitution products, halogenated benzenes and toluenes, nitrobenzene or the like. The examples show how the diluent may be applied in the present process. It is of essential importance for obtaining a good yield that any trace of moisture be excluded during the sulfonation.

The new compounds obtainable by our process which are valuable intermediate products for the synthesis of dye-stuffs of various kinds correspond with the following general formula:

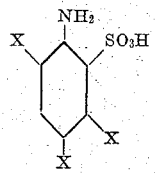

wherein X stands for alkyl, O-alkyl, O-aryl, O-aralkyl, CO-aryl, $SO_2$-aryl, $NO_2$, $SO_3H$, COOH or halogen, and form crystalline colorless powders which easily dissolve in water.

The following examples serve to illustrate the invention, but they are not intended to limit it thereto, the parts being by weight:

(1) 176 parts of 4.6-dichloro-3-amino-1-toluene are dissolved in about 700 parts of carbon tetrachloride. After addition of dehydrated copper sulfate the solution is advantageously allowed to stand for about 12 hours so that even the smallest amount of water which might be present is removed. To the filtered solution there are added drop by drop within about half-an-hour 116.5 parts of chlorosulfonic acid while quickly stirring; for this purpose an apparatus is used which is provided with a reflux condenser and is protected as much as possible against the entrance of moisture. Stirring is continued for some time and the carbon tetrachloride is distilled off while simultaneously introducing about 2000 parts of ortho-dichlorobenzene and heating slowly until the interior temperature rises to 160° C.–170° C. During this operation it is advantageous to force or suck a current of dry air through the apparatus in order to remove quickly the hydrochloric acid which is eliminated. As soon as the current of air leaving the apparatus is free from hydrochloric acid, the reaction is finished.

The sulfonic acid can be isolated in one of the following manners: either the mixture is first filtered by suction, the residue is dissolved in water, the solution is rendered feebly alkaline and then distilled by means of steam, or the whole mixture is distilled by means of steam after having been rendered alkaline. The diluent can also be distilled in a vacuum and the sulfuric acid then transformed into the sodium salt. From the filtered solution of the alkali salt the free 4.6-dichloro-3-amino-1-toluene-2-sulfonic acid of the following probable formula

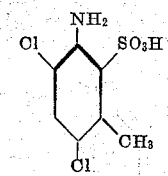

is then separated by means of a mineral acid. After it has been filtered by suction and dried it is a colorless powder, which scarcely dissolves in water, easily dissolves in sodium carbonate, in the form of its sodium salt, and yields a diazo-compound scarcely soluble in water.

(2) 176 parts of 2.5-dichloro-4-amino-1-toluene are dissolved in about 2000 parts of ortho-dichlorobenzene. While vigorously stirring and well cooling 116.5 parts of chlorosulfonic acid are added drop by drop; stirring is continued for some time, and the whole is then slowly heated to about 50° C., and subsequently the temperature is raised to 160° C.–170° C. Apparatus and conditions are the same as in Example 1.

The 2.5-dichloro-4-amino-1-toluene-3-sulfonic acid of the following probable formula

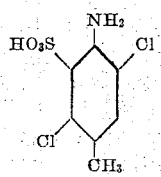

has properties similar to those of the isomeric dichloro-toluidine-sulfonic acid described in Example 1.

The 4.5-dichloro-2-amino-1-toluene-3-sulfonic acid of the following probable formula

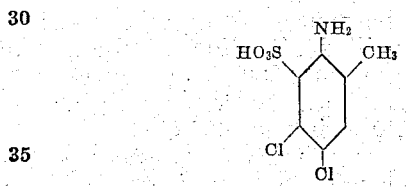

obtained in the same way from 4.5-dichloro-2-amino-1-toluene has similar properties.

(3) By substituting for the 4.6-dichloro-3-amino-1-toluene used in Example 1, 135 parts of pseudocumidine there is obtained under the same conditions the sulfonic acid of the following probable formula

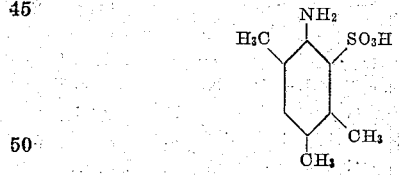

which likewise is a colorless powder and yields a diazo-compound scarcely soluble in water.

(4) 171.5 parts of the product of the following formula:

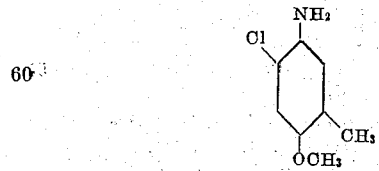

(obtainable by chlorination of 1-acetamino-4-methoxy-5-methylbenzene and subsequent elimination of the acetyl group), are dissolved in about 700 parts of carbon tetrachloride, and 116.5 parts of chlorosulfonic acid are added drop by drop under the conditions stated in Example 1. In place of the carbon tetrachloride distilled off there is added technical chlorotoluene (boiling at about 156° C.). The sulfonic acid of the following probable formula

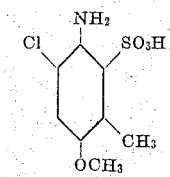

thus produced can be recrystallized from water in the form of its sodium salt and is a colorless powder. It yields a diazo-compound sparingly soluble in water.

The two isomeric sulfonic acids of the following probable formulæ

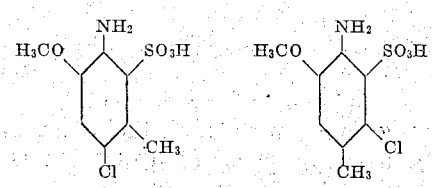

have similar properties and are obtained in an analogous manner; 1-amino-2-methoxy-4-chloro-5-methylbenzene required for the preparation of the former of these sulfonic acids, may be obtained by chlorination of 1-acetamino-2-methoxy-5-methylbenzene and subsequent elimination of the acetyl group.

(5) By substituting for the bases mentioned in the preceding examples 233.5 parts of 5-methyl-4-chloro-2-amino-diphenyl-ether (obtainable by condensation of 2.5-dichloro-4-nitro-1-methylbenzene with phenol and subsequent reduction of the nitro-compound to the amino-compound), there is obtained in like manner an ortho-sulfonic acid of the following probable formula

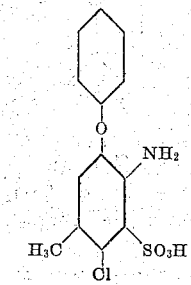

In an analogous manner there are obtained other amino-di-phenyl-ether-sulfonic acids of the following probable formulæ

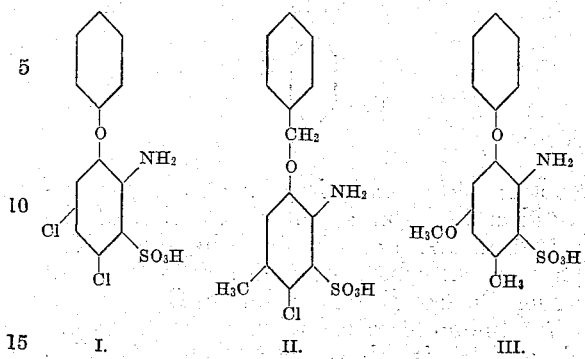

I.   II.   III.

The parent amino-diphenyl ethers from which the compounds represented by the above formulæ I, II and III are made may be obtained as follows:

For compound I—by condensation of 2.4.5-trichloro-1-nitrobenzene with phenol and subsequent reduction of the nitro-group to the amino-group.

For compound II—by condensation of 5-methyl-4-chloro-2-nitro-1-oxybenzene with benzyl chloride and subsequent reduction of the nitro-group to the amino-group.

For compound III—by converting 4-amino-5-nitro-1-methyl-2-methoxybenzene into 4-chloro-5-nitro-1-methyl-2-methoxybenzene by the method of Sandmeyer, condensing the latter compound with phenol, and then reducing the nitro-group to the amino-group.

(6) By performing the operations described in the preceding examples upon 281.5 parts of a compound of the following formula

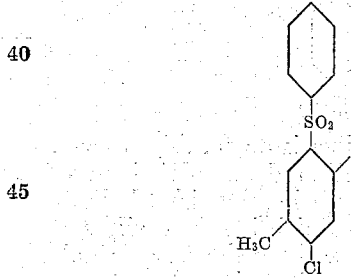

(obtainable by condensation of 2.5-dichloro-4-nitro-1-methylbenzene with benzene sulfinic acid and subsequent reduction of the nitro-group to the amino-compound), the corresponding ortho-sulfonic acid of the following probable formula

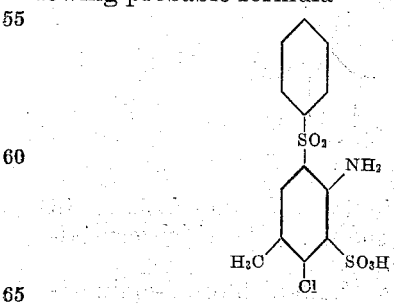

is obtained. In the same way, for instance, the aminoarylsulfones of the following formulæ undergo sulfonation at the place marked X:

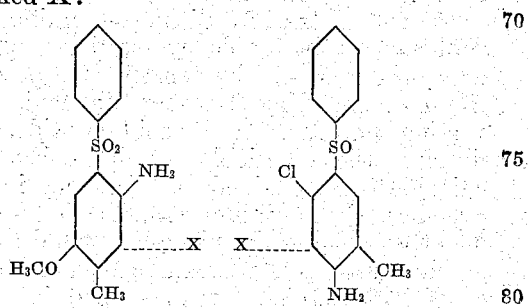

that is, it is immaterial whether ortho-, meta- or para-amino-diarylsulfones are used.

The sulfones represented by the above formulæ may be obtained by condensation of benzene-sulfinic acid with 2-methyl-5-chloro-4-nitro-1-methoxybenzene and 4.5-dichloro-2-methyl-1-nitrobenzene respectively and subsequent reduction of the nitro-group to the amino-group.

(7) 167 parts of a compound of the following formula

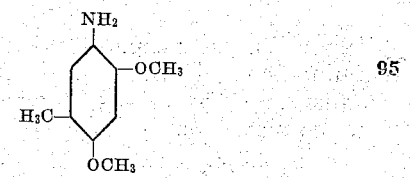

(obtainable by causing 1 molecular proportion of 4.6-dichloro-3-nitro-1-methylbenzene to react with 2 molecular proportions of sodium methylate, and subsequently reducing the nitro-compound to the amino-compound) are dissolved in about 1500 parts of ortho-dichloro-benzene and sulfonated as described in Example 2. The sulfonic acid, which corresponds with the following probable formula

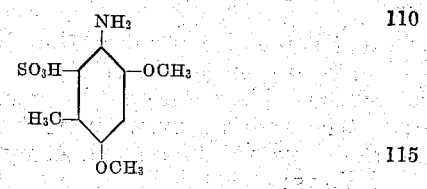

can likewise be re-crystallized from water in the form of its sodium salt and yields a sparingly soluble diazo-compound.

(8) By performing the operations described in the preceding examples upon 196.5 parts of 2.4.5-trichloro-aniline, the sulfonic acid

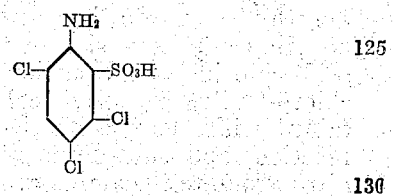

is obtained which is scarcely soluble in water but more readily soluble in the form of its sodium salt; it yields a diazo-compound sparingly soluble in water.

(9) 266 parts of 2.5-dichloro-4-amino-benzophenone (obtainable by oxidizing 2.5-dichloro-4-nitro-1-methylbenzene to produce the corresponding 1-carboxylic acid, converting the latter into its acid chloride, condensing the 2.5-dichloro-4-nitro-1-benzoylchloride thus obtained with benzene in the presence of aluminium chloride and subsequently reducing the nitro-compound to the amino-compound) are transformed under the conditions hereinbefore described into the sulfonic acid of the following constitution

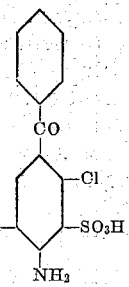

In an analogous manner, for instance, the amino-benzophenones of the following formulæ, amongst others, undergo sulfonation at the places marked X

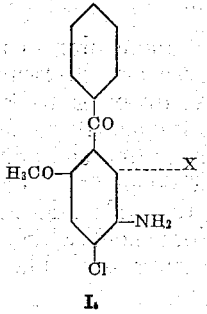 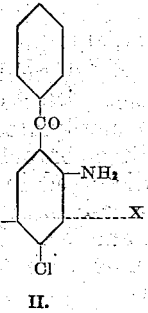

I.  II.

that is to say, not only ortho-, but also meta- and para-amino-diarylketones are accessible to the said operation with good yield.

The amino-benzophenones represented by the above formulæ I and II may be made as follows:

I. By condensation of 4.6-dichloro-3-nitro-1-benzoyl chloride with benzene by the Friedel-Crafts reaction, replacement of one halogen atom in the product by the methoxy-group, and reduction of the nitro-group to the amino-group.

II. By oxidation of 3.4-dichloro-6-nitro-1-methylbenzene to the corresponding 1-carboxylic acid, conversion of the acid into its acid chloride, condensation of the 3.4-dichloro-6-nitro-1-benzoyl chloride thus obtained with benzene by the Friedel-Crafts reaction, and subsequent reduction of the nitro-group to the amino-group.

(10) 155.5 parts of a compound of the following formula

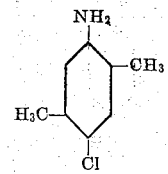

(obtainable by chlorination of acetyl-para-xylidine and subsequent elimination of the acetyl-group) are dissolved in about 1500 parts of nitrobenzene and then sulfonated under the conditions given in Example 1, while the temperature advantageously is not allowed to rise above 160° C.-170° C. The reaction product corresponds with the following probable formula

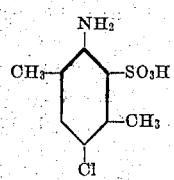

(11) 242 parts of 2.5-dichloraniline-4-sulfonic acid (obtainable by baking 2.5-dichloraniline with sulfuric acid) are finely ground with 1000 parts of tetra-chloro-ethane to produce a suspension. This suspension is poured into the sulfonation apparatus, 116.5 parts of chloro-sulfonic acid are added, and the whole is worked up under the conditions given in the preceding examples. There is obtained the disulfonic acid of the following probable formula:

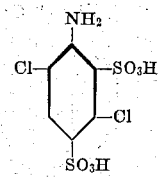

In this case the product is preferably worked up by stirring the filtered and dried material with cold water, whereby the whole of the disulfonic acid—which is very easily soluble in water—is dissolved; the scarcely soluble mono-potassium salt is subsequently precipitated by means of potassium chloride.

(12) 207 parts of 2.5-dichloro-4-nitro-1-amino benzene are transformed in a manner analogous to that prescribed in Example 1 into the sulfonic acid of the following constitution:

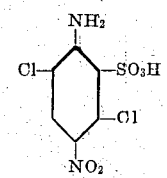

The sulfonic acid is preferably isolated in the form of its sodium salt, which crystallizes from water.

(13) 206 parts of 2.5-dichloro-4-amino-1- benzoic acid are transformed under the conditions hereinbefore described into the sulfonic acid of the following constitution

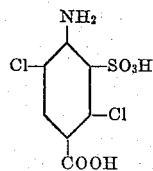

The di-sodium salt is easily soluble in water; this sodium salt or the potassium salt may be crystallized from water.

Instead of the chloro-sulfonic acid used in the examples other halogen-sulfonic acids may be used; thus for instance, 100 grams of fluoro-sulfonic acid may be substituted, with the same result, for the 116.5 grams of chloro-sulfonic acid.

We claim:

1. The compounds of the following general formula

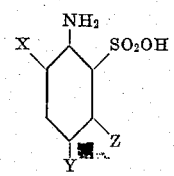

wherein X stands for methyl, methoxy, phenoxy, O-benzyl, benzoyl, $SO_2$-phenyl or chlorine, Y for methyl, methoxy, benzoyl, $SO_2$-phenyl, $NO_2$, $SO_3H$, COOH or chlorine, Z for methyl, benzoyl, or chlorine, being crystalline colorless powders dissolving in water.

2. The compound of the following probable formula

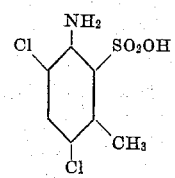

being a colorless crystalline powder, dissolving in water and in sodium carbonate.

3. The compound of the following probable formula

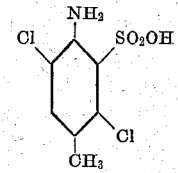

being a colorless crystalline powder, dissolving in water and in sodium carbonate.

4. The compound of the following probable formula

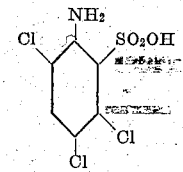

being a colorless crystalline powder, dissolving in water and in sodium carbonate.

5. The compounds of the following general formula:

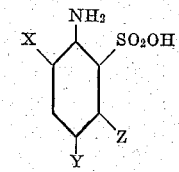

wherein X stands for chlorine, methyl, methoxy or phenoxy, Y represents chlorine, methyl or methoxy, and Z means chlorine or methyl, said products being colorless powders soluble in water.

6. The compounds of the following general formula:

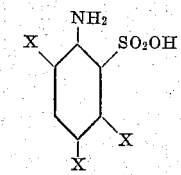

wherein the X's stand for chlorine or methyl, said products being colorless powders soluble in water.

In testimony whereof, we affix our signatures.

ERICH FISCHER.
ALBERT KISSLING.
HERBERT KRACKER.